STORAGE SYSTEM FOR ELECTRIC SIGNALS
Filed July 1, 1957 4 Sheets-Sheet 1
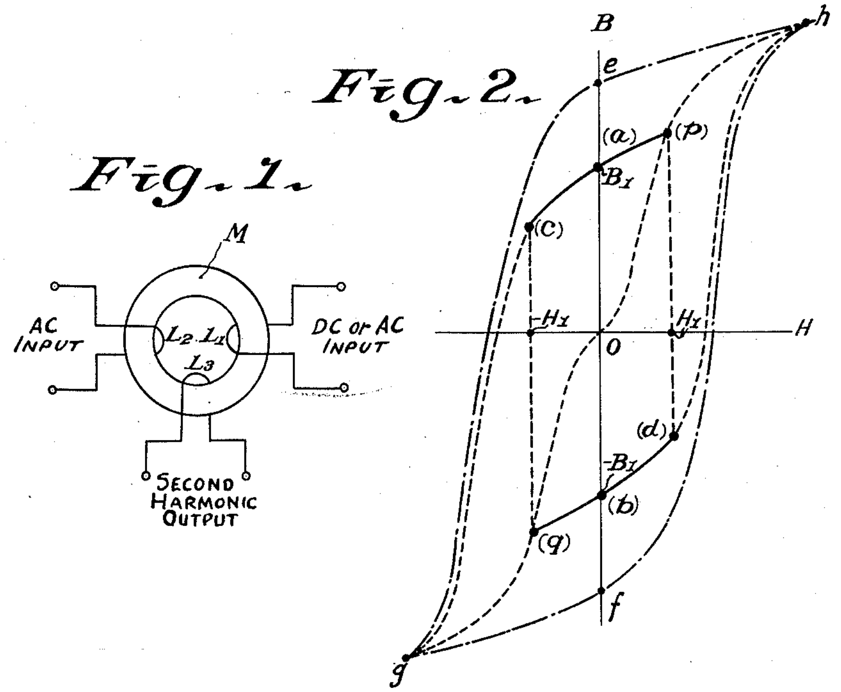
Fig. 1. Fig. 2.
Fig. 3A. Fig. 3B. Fig. 3C.
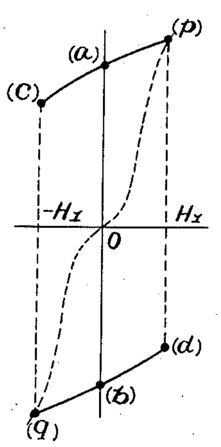
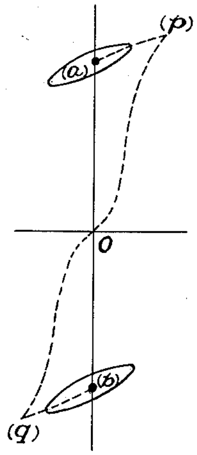
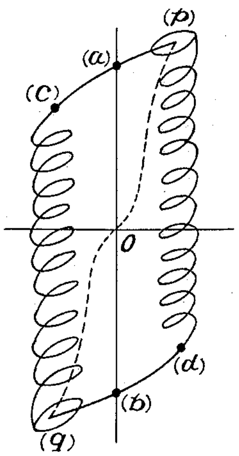

STORAGE SYSTEM FOR ELECTRIC SIGNALS

Filed July 1, 1957

United States Patent Office 3,116,475 Patented Dec. 31, 1963

3,116,475
STORAGE SYSTEM FOR ELECTRIC SIGNALS

Shintaro Oshima, Tokyo-to, and Hajime Enomoto, Ichikawa-shi, Chiba-ken, Japan, assignors to Kokusai Denshin Denwa Kabushiki Kaisha, Tokyo-to, Japan Filed July 1, 1957, Ser. No. 669,049
Claims priority, application Japan July 4, 1956
3 Claims. (Cl. 340—174)

This invention relates to an improved system for recording and storing electric signals.

The so-called "parametron" which utilized the electric oscillation of a parametrically excited resonator was recently invented. British Patent No. 778,883 was issued for this invention. In the parametron, the phase of the oscillation output is set to only one of two signal phases which differ by a phase angle of about 180° from each other, and the phase of the oscillation can be controlled by the phase of an infinitesimal input signal; for this reason, the parametron has been used broadly as a logic element in electronic computers or electric communication apparatus to transform the binary digits "0" and "1," respectively, into 0-radian oscillations and $\pi$-radian oscillations.

An object of the present invention is to provide a recording system or memory device which is most suitable for an electronic computer or electric communication apparatus utilizing one or more parametrons.

Another object of this invention is to provide a memory device of small size which is suitable for high-speed computers or electric communication apparatus utilizing parametrons.

According to the present invention, there is provided a storage system for electric signals comprising a matrix in which is arranged a plurality of signal-storing elements each preferably having substantially rectangular hysteresis characteristics between a ferro-electric or ferromagnetic field applied thereto and the induction thereof; a series of line conductors and a series of column conductors electrically or magnetically coupled with the elements; means for simultaneously applying both an alternating-current signal and a direct-current signal to a selected line conductor and a selected column conductor to establish in the storage element coupled with the selected line and column conductors a residual polarization which is proportional to an information input signal and has a polarity corresponding to the input signal thereby recording the input signal; and means for applying an alternating-current signal to at least one of the selected conductors for inducing an output alternating-current signal whose phase is related to the polarity of the storing element recording the information signal so as to reproduce the recorded information signal.

In such a recording system as described above, direct current and alternating current are used for recording and alternating current is used for nondestructive reading, so that the hysteresis characteristic of the electric storage element (i.e. the ferro-magnetic or ferro-electric element) is not limited to a rectangular shape and may be of round configuration as will be described hereinafter.

When a direct-current magnetic field and an alternating-current magnetic field are simultaneously applied to a ferro-magnetic or ferrodielectric storage element, it is possible to effect a polarization of the element corresponding to the polarity of the applied direct current magnetic field, whereby a message corresponding to the applied direct current can be stored as the polarization magnitude. Furthermore, when an alternating current magnetic field of a strength insufficient to destroy the recorded polarization is applied to the storage element, an alternating output current whose phase corresponds to the direction of polarization and whose amplitude is proportional to the magnitude of polarization can be obtained. Accordingly, by utilizing the above-mentioned process, it is possible to provide an excellent memory system, having a large capacity for information signals to be recorded, wherein binary digits as well as said analogue signals can be recorded, even if the input signal is small, and the reading-out of recorded signals is carried out without destroying the recorded signal.

The novel features which are believed to be characteristic of the present invention are set forth with particularity in the appended claims, the present invention itself, however, both as to its organization, manner of construction, and method of operation, together with further objects and advantages thereof, may best be understood by reference to the following description taken in connection with the accompanying drawings, in which:

FIG. 1 is a circuit diagram according to the invention;

FIG. 2 is a B/H curve of a magnetic core to be used for describing the principles of this invention;

FIGS. 3A, 3B and 3C are B/H curves for describing the operation of the recording system of this invention;

Figure 4:
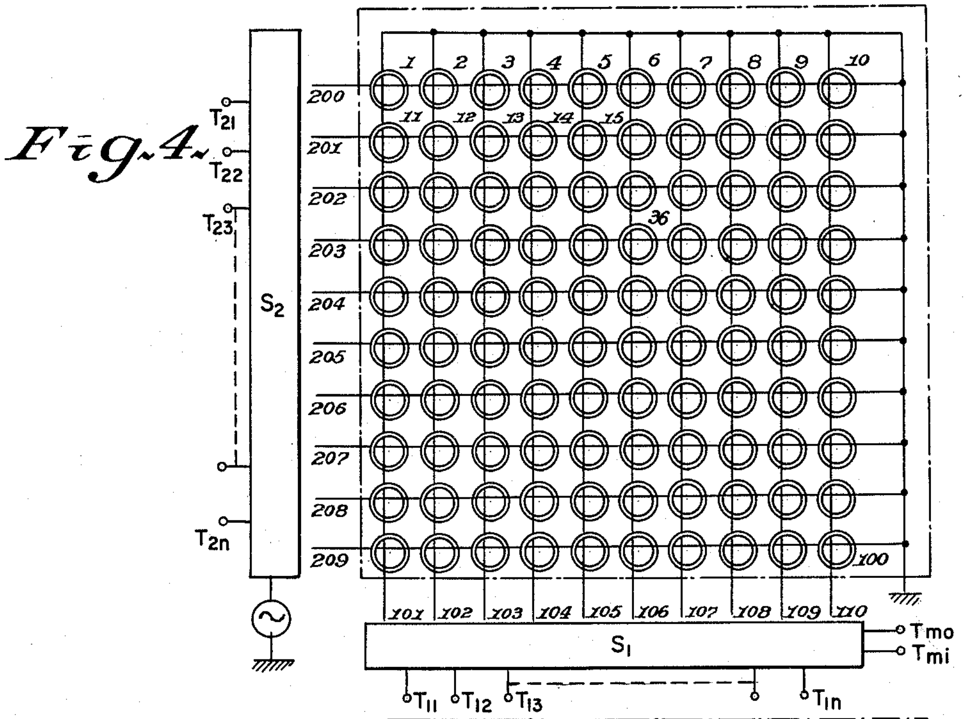
FIG. 4 is a circuit diagram of one embodiment of this invention.

As indicated in FIGS. 1 and 2, when a ferromagnetic core M having an initial magnetic characteristic as shown by the broken line (*g*)—(*q*)—(*o*)—(*p*)—(*h*) and the magnetic hysteresis characteristic such as shown by the dot-and-dash line (*g*)—(*f*)—(*h*)—(*e*)—(*g*) in FIG. 2 is magnetized, after the removal of magnetization, by applying a direct-current magnetic field $H_1$, the magnetic induction of the core varies along the broken line (*o*)—(*p*) and when this magnetic field becomes zero, the induction decreases along the solid line (*p*)—(*a*) due to the minor hysteresis characteristic of said core, whereby the residual magnetic induction $B_1$ is established at the point (*a*). On the other hand, when the core M, after demagnetization thereof, is magnetized by the magnetic field $-H_1$, the magnetic induction of said core varies along the line (*o*)—(*q*) and then increases along the full line (*q*)—(*b*) when the magnetic field becomes zero, whereby the residual magnetic induction $-B_1$ is established at the point (*b*). However, when the magnetic field varies between $H_1$ through zero and $-H_1$ after the polarization of the core M is established at the point (*a*) or (*b*), the magnetic induction returns to the value corresponding to the point (*a*) or (*b*), because the minor hysteresis characteristic of solid line (*p*)—(*c*) or (*q*)—(*d*) in FIG. 3A can be made almost reversible by a suitable magnetic field $H_1$. When an alternating current magnetic field of an intensity less than the coercive force $H_c$ (FIG. 9) is applied to the ferro-magnetic core M after the polarization of said core is established at the point (*a*) or (*b*), the magnetic induction of said core varies along the solid line in FIG. 3B, and returns to the point (*a*) or (*b*) upon the disappearance of the magnetic field.

Accordingly, the polarization state of a polarized ferromagnetic element cannot be varied by mere application of a direct-current magnetic field or an alternating-current magnetic field as long as the magnetic field of said element is maintained at a suitable intensity, and the residual magnetism returns again to its polarized point (*a*) or (*b*) upon the disapppearance of the magnetizing field. However, if both the direct-current magnetic field $-H_1$ and an alternating-current magnetic field are simultaneously applied to the polarized ferro-magnetic element M which has been polarized to a point (*a*), for instance, the magnetization state varies from the point (*c*) while describing a spiral line as shown in FIG. 3C, the spiral variation being caused by the irreversible hysteresis characteristic due to the resultant field of a direct-current magnetic field and an alternating current magnetic field. Then the magnetic induction falls from the point (*c*) to the point (*q*), and when both the direct-current magnetic field and alternating-current magnetic field are reduced to zero, the residual flux climbs to the stable point (*b*) of negative polarity instead of the point (*a*) of positive polarity. On the other hand, when the ferro-magnetic element is inversely polarized to a point (*b*) of negative polarity and then a direct-current magnetic field $+H_1$ and an alternating-current magnetic field are simultaneously applied to said element, the magnetization state varies from the point (*b*) while describing a spiral line as shown in FIG. 3C for the same reason mentioned above. Then the magnetic induction climbs from the point (*d*) to the point (*p*), and when both the direct current magnetic field and flux are cut off, the induction drops to the stable point (*a*) of positive polarity. When a ferro-magnetic element polarized to a point (*a*) or (*b*) is magnetized with a direct-current magnetic field $H_1$ or $-H_1$ of polarity corresponding to the sense of polarization of said magnetic element and with an alternating-current magnetic field, the magnetic induction only varies along a closed circle at the point (*p*) or (*q*), and returns to the stable residual-magnetism points (*a*) or (*b*) upon the disappearance of the magnetic field. Accordingly, any ferro-magnetic element can be polarized to the same polarity as that established by the direct-current magnetic field by suitable selection of the amplitude of an alternating-current magnetic field.

Now, when a ferro-magnetic core polarized to a point (*a*) or (*b*) and having a coil wound thereon is energized by an alternating current magnetic field, a second-harmonic voltage is induced in said coil owing to the non-linear characteristic of the magnetic induction of the core. This non-linear characteristic at the point (*a*) is opposite to that at the point (*b*) as will be seen from the magnetization curve in FIG. 2, so that either one of two second-harmonic voltages, the phases of which differ by about 180° from each other, can be led out from the coil wound on the core depending upon the direction of polarization of the magnetic core.

This invention is based on the above-mentioned phenomenon and relates to a system, in which the reproducing signals can be led out as binary digital signals accommodated to the phase difference, without destroying the stored signals.

As described above, when both the direct-current magnetic field and alternating-current magnetic field are simultaneously applied the hysteresis characteristic becomes irreversible and when either the D.C. or the A.C. magnetic field is individually applied the hysteresis characteristic becomes almost reversible; even a storage element having round hysteresis characteristics can be used instead of that having rectangular hysteresis characteristics.

Figures 5, 9:
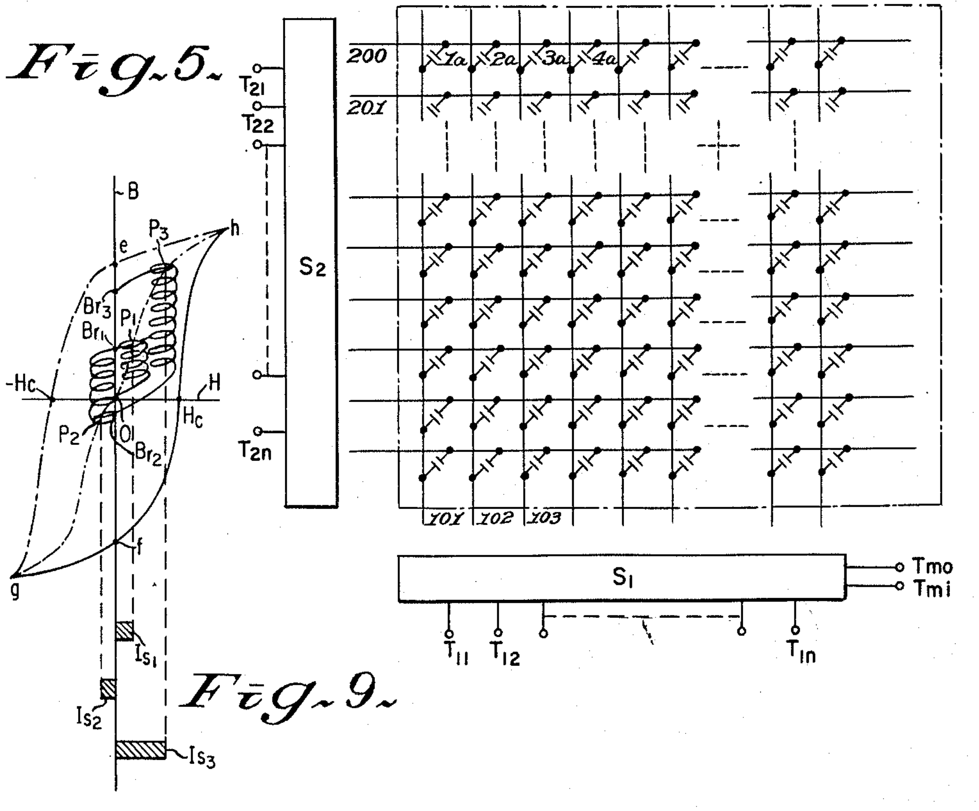
FIG. 5 is a circuit diagram of another embodiment of this invention.
FIG. 9 is a hysteresis curve of the storage element showing successive states of information retention.
Figure 8:
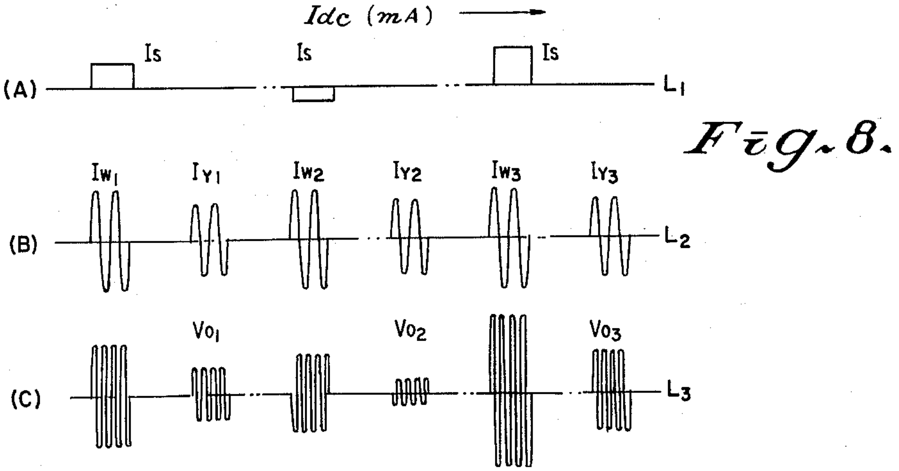
FIG. 8 is a waveform-timing diagram illustrating the operation of the circuits.

The above-mentioned operation can be easily understood from the following description relating to FIGS. 1, 8 and 9. In FIG. 8A, current pulses $Is_1$, $Is_2$ and $Is_3$ show successive direct-current signals to be applied to the coil $L_1$ of FIG. 1. In this case, the pulses $Is_1$ and $Is_3$ are of positive polarity and the pulse $Is_2$ is of negative polarity. In FIG. 8B, currents $Iw_1$, $Iw_2$ and $Iw_3$ are alternating currents to be applied to the coil $L_2$ simultaneously with the D.C. pulses to write into the polarizable element. A.C. currents $Ir_1$, $Ir_2$ and $Ir_3$ are the read-out energizing currents to be applied to coil $L_2$. FIG. 8C illustrates voltages $Vo_1$, $Vo_2$ and $Vo_3$ which are the output signals derived from the coil $L_3$. As shown clearly by the waveform diagrams in FIG. 8, the direct-current (D.C.) signal $Is_1$ and the alternating-current (A.C.) signal $Iw_1$ are applied simultaneously to the coil $L_1$ or coil $L_2$ so that the D.C. signal $Is_1$ is recorded in magnetic core M, which has a rectangular hysteresis curve, as a state of residual magnetism. FIG. 9 illustrates the residual-magnetism modes for successive write-in D.C. signals $Is_1$, $Is_2$ and $Is_3$. The magnetic induction produced jointly by the superimposed pulses $Is_1$ and $Iw_1$ shifts the magnetic state of the core M from point O to point $P_1$ to produce a residual magnetism $Br_1$. Then, when the A.C. signal $Ir_1$ is applied to the coil $L_2$, the A.C. output signal $Io_1$ is derived from the coil $L_3$. In this case, said output signal $Vo_1$ has a frequency corresponding to the second upper harmonic of the A.C. signal $Ir_1$, an amplitude proportional to that of D.C. signal $Is_1$, and, furthermore, a phase (in this case "0" phase) corresponding to the "positive" polarity of D.C. signal $Is_1$. In a similar manner the residual magnetisms produced upon writing in of signals $Is_2$ and $Is_3$ lead to induction states $Br_2$ and $Br_3$. In the same way, the output signals $Vo_2$ and $Vo_3$ corresponding to induction states $Br_2$ and $Br_3$ are obtained. However, the phase of output signal $Vo_2$ is offset by 180° from that of output signal $Vo_1$, because the polarity of D.C. signal $Is_2$ is negative. (Since the polarity of said output signal $Vo_1$ has been assumed to be "0" phase, the polarity of this output signal $Vo_2$ is "$\pi$" phase.) Amplitudes of the output signals $Vo_2$ and $Vo_3$ are, respectively, proportional to those of the D.C. signals $Is_2$ and $Is_3$.

In the embodiment of this invention as illustrated in FIG. 4, a plurality of magnetic cores 1, 2, 3, 4 . . . 100, each being made of ferromagnetic material, such as ferrite, having the above-mentioned hysteresis characteristic, is arranged in a matrix array with ten lines and ten columns, and column electric conductors 101, 102, 103 . . . 110 and line electric conductors 200, 201 . . . 209 are, respectively interlinked with said magnetic cores in the columns and lines.

As an example, let it be assumed that a signal is to be recorded in any core, for instance, core 36. In this case, the column electric conductor 106 and the line electric conductor 203, which are interlinked with the core 36, are selected, respectively, by means of recording and read-out means such as conventional switching devices $S_1$ and $S_2$ (e.g. relays, vacuum tubes or parametrons), to which the selecting signals are applied through terminals $T_{11}$, $T_{12}$ . . . $T_{1n}$ and terminals $T_{21}$, $T_{22}$ . . . $T_{2n}$, whereby the positive or negative direct current corresponding to the message (binary digit) applied to the message-input $Tmi$ is applied to the column conductor 106 and, simultaneously, an alternating current of small amplitude is applied to the line conductor 203. The frequency of said alternating-current signal may be any value in the recording, but when the apparatus is used together with an electric computer utilizing parametrons, the frequency is preferably selected so as to be ½ the resonance frequency $f$ of the parametron circuit.

In this case, a direct-current magnetic field is applied to the magnetic cores interlinked with the column conductor 106 including the core 36 and an alternating magnetic field is applied to the magnetic cores interlinked with the line conductor 203 including the core 36. However, in magnetic cores other than the core 36, the polarities are not varied, as previously described in connection with FIGS. 3A and 3B, because only one kind of the magnetic field is applied to these cores.

On the other hand, since both the direct-current magnetic field and alternating-current magnetic field are applied at the same time to the core 36, the polarity of the residual polarization of this core can be made to vary in accordance with the direction of the magnetization by the direct-current magnetic field, as previously described with respect to FIG. 3C. Accordingly, in the core 36, a signal can be recorded in accordance with the information-input signal which has been previously transformed into a binary digital signal, whereby the information-input signal applied to the message-input terminal $Tmi$ is recorded as the direction of the polarization, said recorded signal is maintained at the point ($a$) or ($b$) of FIG. 2 in accordance with the polarity of said polarization even when the signal currents applied to the conductors 106 and 203 are cut off.

In the reproduction of the information recorded in the core 36, an alternating current is applied to only one of the conductors 106 and 203, which have been used for recording (e.g. to the conductor 203), whereby an electric voltage is induced in the other selected conductor 106. The second-harmonic induced voltage can be led out as the reproduced signal corresponding to the input signal whose phase differs by 180° depending upon whether the polarization of the core 36 is positioned at the point ($a$) or ($b$). Accordingly, when said signal current is to be used as the control current of the parametron, which constitutes phase-discriminating means schematically shown at $S_1$, and the frequency of the alternating current signal applied to the conductor 203 is selected so as to be ½ the resonance frequency $f$ of the parametron circuit, the signal current of 0 radian or $\pi$ radian led out from the conductor 106 can be used, as is, for the control signal of the parametron.

In just above described case, when an alternating current signal is applied to the conductor 203, the magnetic induction of the core 36 which has been polarized to the point ($a$) or ($b$) of FIG. 2 varies along the closed curve formed around the point ($a$) or ($b$), as will be seen from the FIG. 3B, and the polarized point of the core returns to the position near the original point ($a$) or ($b$) upon the disappearance of the alternating-current signal of the conductor 203, so that the stored signal is not destroyed during the reproducing operation, whereby repeated reproduction of the recorded signal is possible until the next resetting signal is recorded.

The above description relates to the recording of any information signal in only one ferromagnetic core and to the reproduction thereof, but desirable recording of various information signals and the reproduction thereof can be achieved in all of the ferromagnetic cores, in the same manner, by suitable selections of the conductors and information signals.

The above embodiment of this invention relates to the case wherein the ferro-magnetic elements having magnetic hysteresis character are used as the storage elements, but this invention may be embodied by the use of ferro-electric elements, each consisting of a dielectric material such as barium titanate having a hysteresis character of the previously described type.

The embodiment of FIG. 5 relates to a memory device in which ferrodielectric elements 1$a$, 2$a$, 3$a$ . . . are used as the storage elements, each being made by adhering electro-conductive films on both surfaces of a barium titanate, and said elements being connected to column conductors 101, 102 . . . and to line conductors 200, 201, . . . .

The functions and operations of the embodiment of FIG. 5 are the same as those of the embodiment of FIG. 4 except that, while the function of the magnetic core is caused by an electric current, the ferrodielectric element is operated by the electric voltage.

According to the system of this invention, as will be understood from the above explanation, in the recording of any signal, low power is required for the establishment of the residual polarization, whereby the use of a small-sized electric power source is made possible.

In the embodying of this invention, when a ferro-magnetic core M having the coils $L_1$, $L_2$, and $L_3$ wound thereupon such as shown in FIG. 1 is magnetized with the superimposed magnetic field consisting of a direct-current magnetic field and an alternating-current magnetic field by means of applying a direct current and an alternating current, respectively to said coils $L_1$ and $L_2$ to establish a polarization of the core M in accordance with the direct current magnetic field, a linear relationship between the magnitude of the polarization and the magnitude of the direct current magnetic field of said core M can be obtained by the suitable selection of the amplitude of the applied alternating current.

Figure 6:
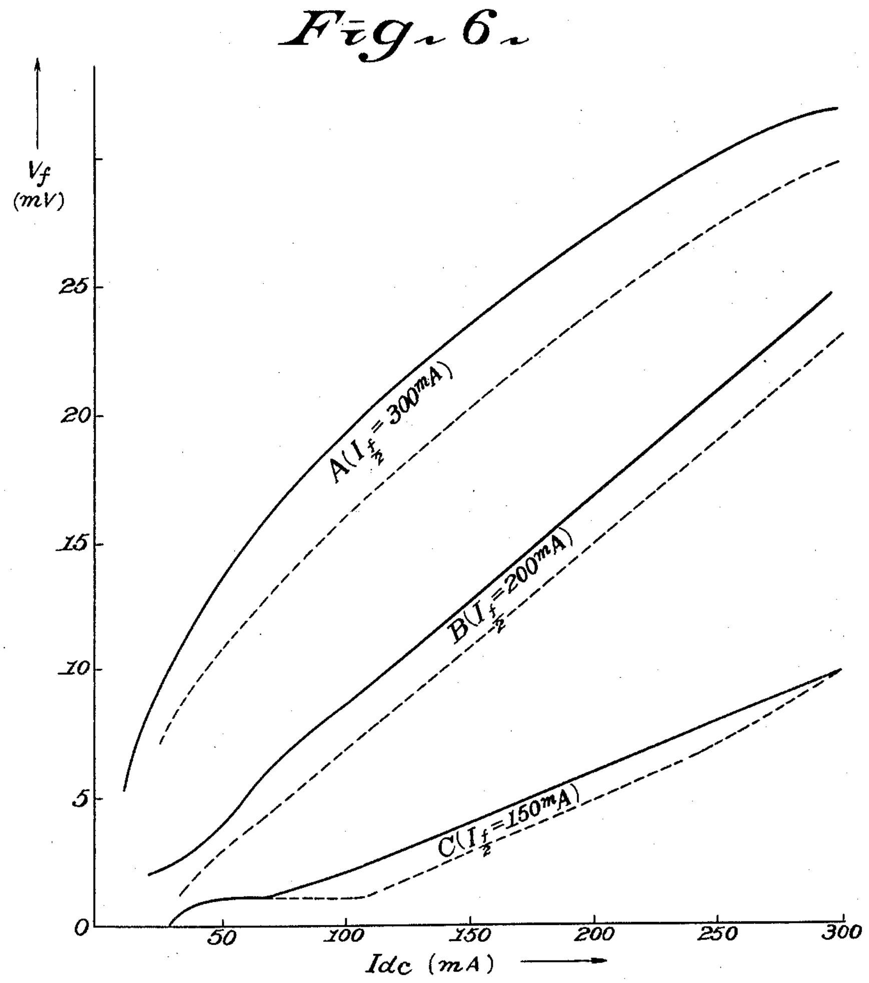
FIG. 6 is a graph of voltage-current-characteristic curves illustrating the principles of the invention.

We have found that, if the core M, in which the polarization proportional to the applied direct current field has been established as described above, is additionally excited by applying an alternating current, having an amplitude which is insufficient for destroying said polarization, to the coil $L_2$, an induced voltage having the upper second-harmonic frequency and whose amplitude is linearly proportional to the magnitude of the polarization of the core M can be led out from the coil $L_3$ as shown in FIG. 1. In FIG. 6 are shown the characteristic curves for indicating the results obtained by experiments relating to this fact. In these experiments, the ferro-magnetic core M made of ferrite the thickness, outer diameter, and inner diameter of which are, respectively, 1 mm., 4 mm. and 2 mm. are used, and the number of turns of the coils $L_1$, $L_2$, and $L_3$ wound around the core M are, respectively, selected so as to be 1, 1 and 4. The characteristic curves of FIG. 6 show the relation between the direct current $I_{dc}$ (recording current) applied to the coil $L_1$ and the second-harmonic voltage $V_f$ (reproducing voltage, 1 mc.) induced in the coil $L_3$ in the case of application of only the alternating current $I_{f/2}$ (500 kc.) to the coil $L_2$ after the polarization of the core is established by the application of the currents $I_{dc}$ and $I_{f/2}$, wherein the magnitude of the current $I_{f/2}$ was adopted as the parameter.

The curves A, B, and C correspond, respectively, to 300 ma., 200 ma., and 150 ma. of the current $I_{f/2}$. The solid lines represent the characteristics between the current $Id$ and the voltage $V_f$ having the frequency $f$, said voltage being induced in the coil $L_3$ due to the current $I_{f/2}$ when a signal is recorded in the core by the simultaneous application of the current $I_{dc}$ and $I_{f/2}$, respectively, to the coil $L_1$ and $L_2$ after said core has been demagnetized and brought to the origin of its hysteresis characteristic. The broken lines correspond to the case in which a signal is recorded in the core in the same manner as the above-mentioned case, but in this case the polarity of the current $I_{dc}$ is inverted. If the alternating current $I_{f/2}$ flowing in the coil $L_2$ is selected so as to be 200 ma., it will be seen that it is possible to maintain the reproduced voltage $V_f$ linearly proportional to the recording current $I_{dc}$ as indicated in the curve B and to use relatively low recording power because only low currents are needed for the recording.

In the above experimental example, the amplitude of the alternating current $I_{f/2}$ is made equal in both recording and reproduction, but it is not always necessary to make said amplitude equal in both cases. The current to be used for the reproduction may be suitably selected so that the polarization of the core M is not destroyed.

The fact that the second-harmonic voltage, which is linearly proportional to the magnitude of the polarization of the core M, is induced in the coil $L_3$ by the application of the current $I_{f/2}$ to the coil $L_2$, means that the square component among the nonlinear characteristics is linearly proportional to the magnitude of the polarization of the core M. According to utilization of the above phenomenon, it will be understood that when the electric currents $I_{f2}$ and $I_{f3}$ having different frequencies $f_2$, $f_3$ are applied, respectively, to the coils $L_1$ and $L_2$ of FIG. 1, an electric voltage, having a modulated frequency $f_1=(f_2\pm f_3)$ and an amplitude, which is proportional to the polarization magnitude of the core M and to the product of the electric currents, will be induced in the coil $L_3$.

In the above case, the amplitudes of the alternating electric currents $I_{f2}$ and $I_{f3}$ should not be over the value capable of destroying the polarization, and the currents $I_{f2}$ and $I_{f3}$ may be applied to only one of the coils $L_1$ and $L_2$ in the superimposed state thereof.

That is to say, when an alternating current having a frequency $f/2$ is applied to only the coil $L_2$, the following relation is obtained.

$$f_2=f_3(=f/2)$$

On the other hand, when the same current as above, having a frequency $f/2$, is applied to the coils $L_1$ and $L_2$, a voltage, having the following modulated frequency will be obtained.

$$(f/2+f/2)=f$$

The above description relates only to the case in which ferro-magnetic cores are used, but the operation and function of the device utilizing ferro-electric elements are entirely the same as those in the former case as long as the electric field is used in the place of the magnetic field.

Another embodiment of this invention to which is applied the above-mentioned principle will be explained in connection with FIG. 4. For the storage of any signal in one magnetic core, for instance, in the core 36, the column conductor 106 and the line conductor 203 are first selected in the same manner as in the above-mentioned embodiment, and then while a direct-current signal whose polarity and amplitude relate to the input information signal to one of said conductors, for instance the conductor 106, an alternating-current signal, having a constant amplitude selected so as to make the magnitude of polarization of the core proportional to the above-mentioned direct current signal, is applied to the conductor 203, whereby the direct-current magnetic field and alternating-current magnetic field first are applied, in the superimposed state, only to the magnetic core 36 among the cores arranged in matrix, so that polarization having the direction and magnitude corresponding to the polarity and magnitude of the direct current signal will be imparted only to the core 36, thus effecting the recording of the information. This recorded information remains even when the current of the conductor 203 is brought to zero.

For the reproduction of the information recorded in the core 36 in the form of direction and magnitude of the polarization, the conductors 106 and 203 are selected as in recording, and an alternating current signal of a magnitude which is insufficient to destroy the polarization is applied to only one of said conductors, for instance, to the conductor 203. Then, an electric voltage is induced in the conductor 106, whereby the second-harmonic component (modulated product component) can be led out as the reproduced signal having an amplitude which is proportional to the magnitude of polarization of the core 36 and has a phase which differs by 180° in accordance with the polarization direction of the core 36.

The above explanation relates to the recording and reproduction of any information in only one magnetic core 36, but desirable information can be recorded, reproduced or re-recorded in all of the magnetic cores, in the same manner as the above operation by suitable selection of the conductors and information input signals.

Figure 7:
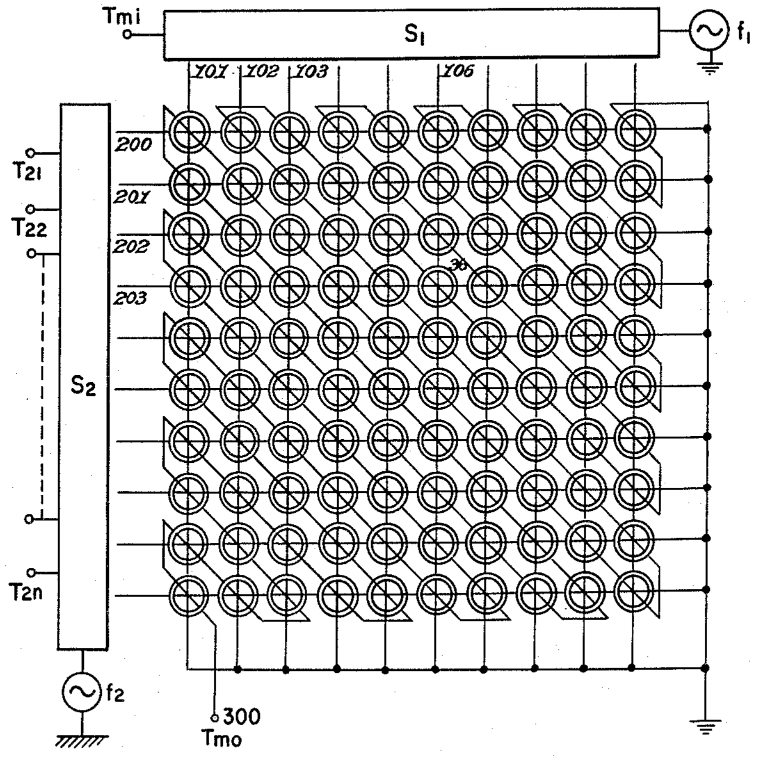
FIG. 7 is a circuit diagram of a further embodiment of this invention.

The system illustrated in FIG. 7 relates to still another embodiment of this invention in which the alternating currents $I_{f1}$ and $I_{f2}$ the frequencies of which are, respectively, $f_1$ and $f_2$ are applied, respectively, to the conductors 106 and 203, and an output signal having a frequency equal to the modulated product $(f_1+f_2)$ or $(f_1-f_2)$ of the frequencies of the currents $I_{f1}$ and $I_{f2}$, and corresponding to the magnitude of polarization of the core 36 and to the product of the amplitudes of the current $I_{f1}$ and $I_{f2}$ is led out from the terminal *Tmo* of the conductor 300 as the reproduction signal. In this case, the component having the modulated frequency is taken out from only the magnetic core 36 and only the components having, respectively, the frequencies $2f_1$ and $2f_2$ are led out from the cores. Accordingly, there is an advantage in that, when only the component having the frequency of modulated product is led out from the core 36, the information of the core 36 can be reproduced effectively without accepting any disturbance due to the components taken out from the other cores.

The sysetem of FIG. 7 relates to the embodiment, in which ferro-magnetic cores having hysteresis characteristic are used as the original storing elements, but said system may be embodied by utilizing dielectric elements having hysteresis characteristic of residual polarization, for instance, barium titanate, as the signal storing elements. Of course, in this case, the dielectric element is actuated by an electric voltage instead of an electric current.

As will be understood from the above-mentioned fact, the system of this invention can carry out analogue memorization of any information signal as well as binary digital memorization of said signal, so that the information of remarkably larger amount than that of the conventional memory system can be memorized, thus permitting very effective utilization of the memory system for the electric computers.

Moreover, application of the system of this invention to any memory apparatus of binary digital computers can be easily embodied by providing a digital/analogue converter between the computing device and memory device in the case of recording, and by providing an analogue/digital converter between said devices in the case of reproduction.

While we have described particular embodiments of our invention, it will, of course, be understood that we do not wish our invention to be limited thereto, since many modifications may be made and we, therefore, contemplate by the appended claims to cover all such modifications as fall within the true spirit and scope of our invention.

We claim:

1. In an electronic computing system, in combination, at least one polarizable storage element having a substantially rectangular hysteresis characteristic; message-recording means for polarizing said element in accordance with a message, thereby recording said message in said element, said recording means including first means for impressing an alternating electromagnetic field on said element of a constant maximum amplitude insufficient to reverse a previously polarized state thereof, and second means for simultaneously impressing a direct electromagnetic field of variable magnitude on said element in a direction characteristic of a first aspect of said message and an intensity characteristic of a second aspect of said message, thereby polarizing said element in a sense corresponding to said first aspect of said message with a magnitude of polarization corresponding to said second aspect of said message, the amplitude of said direct field exceeding in conjunction with said maximum amplitude of said alternating field that necessary to reverse said state; and read-out means for deriving a signal representative of said message from said element, said read-out means including energizing means for impressing at least one alternating electromagnetic field of a maximum amplitude insufficient to destroy residual polarization of said element on the latter, and output means including phase-discriminator means operatively coupled to said element for receiving an alternating-current signal representative of said message upon activation of said element by said energizing means, the phase of said alternating-current signal being indicative of the direction of polarization of said element and the amplitude of said alternating-current signal being proportional to the magnitude of said constant electromagnetic field, said output means being responsive to said amplitude of said alternating-current signal.

2. The combination defined in claim 1 wherein the frequency of the alternating-current signal detected by said output means upon activation of said element by said energizing means is substantially the second-higher harmonic of the alternating-current signal applied by said energizing means to said element.

3. In an electronic computing system, in combination, a plurality of polarizable storage elements, each having a substantially rectangular hysteresis characteristic, arranged in a matrix; a set of line conductors and a set of column conductors electromagnetically coupled intersectingly to said matrix whereby each of said line conductors and each of said column conductors are coupled to a common one of said elements; message-recording means for applying an alternating current of an amplitude insufficient to reverse a previously polarized state of one of said elements to a selected conductor of one of said sets, and for simultaneously applying to a selected conductor of the other of said sets a direct current of a variable magnitude sufficient in conjunction with said alternating current to reverse said state, said direct current being representative of a message to be recorded, thereby residually polarizing the storage element common to both of said selected conductors in a direction characteristic of one aspect of said message and to a degree characteristic of another aspect of said message; and read-out means including energizing means for simultaneously applying an activation-alternating current to said selected conductors and phase- and amplitude-responsive output means inductively coupled to the element common to said selected conductors for receiving an alternating-current signal upon activation of said common element whose frequency is the modulated resultant of said different frequencies, the phase of said alternating-current signal being indicative of the direction of polarization of the element common to said selected conductors and whose amplitude is proportional to the magnitude of the residual polarization of said common element.

References Cited in the file of this patent

UNITED STATES PATENTS

| | | |
|---|---|---|
| 2,832,945 | Christensen | Apr. 29, 1958 |
| 2,845,611 | Williams | July 29, 1958 |
| 2,856,596 | Miller | Oct. 14, 1958 |
| 2,945,214 | Kilburn et al. | July 12, 1960 |
| 2,946,045 | Goto | July 19, 1960 |

OTHER REFERENCES

"A Radio-Frequency Nondestructive Readout for Magnetic-Core Memories," by Bernard Widrow, published by "IRE Transaction-Electronic Computers," vol. EC-3, issue 4, pages 12–15, December 1954.